US009010030B2

(12) United States Patent
Davis

(10) Patent No.: US 9,010,030 B2
(45) Date of Patent: Apr. 21, 2015

(54) GUTTER GUARD APPARATUSES AND METHODS

(71) Applicant: L. B. Plastics Inc., Mooresville, NC (US)

(72) Inventor: Harry H. Davis, Mooresville, NC (US)

(73) Assignee: L.B. Plastics Inc., Mooresville, NC (US)

( * ) Notice: Subject to any disclaimer, the term of this patent is extended or adjusted under 35 U.S.C. 154(b) by 0 days.

(21) Appl. No.: 14/228,851

(22) Filed: Mar. 28, 2014

(65) Prior Publication Data

US 2015/0033638 A1    Feb. 5, 2015

Related U.S. Application Data

(60) Provisional application No. 61/862,337, filed on Aug. 5, 2013, provisional application No. 61/866,211, filed on Aug. 15, 2013.

(51) Int. Cl.
*E04D 13/00* (2006.01)
*E04D 13/076* (2006.01)
*B29C 65/08* (2006.01)

(52) U.S. Cl.
CPC ............ *E04D 13/076* (2013.01); *B29C 65/08* (2013.01)

(58) Field of Classification Search
CPC .... E04D 13/076; E04D 13/04; E04D 13/0404
USPC ....................................... 52/11–16
See application file for complete search history.

(56) References Cited

U.S. PATENT DOCUMENTS

| | | | | | |
|---|---|---|---|---|---|
| 3,458,386 | A | * | 7/1969 | Shanok et al. | 428/163 |
| 4,959,932 | A | * | 10/1990 | Pfeifer | 52/12 |
| 4,965,969 | A | | 10/1990 | Antenen | |
| 5,406,754 | A | * | 4/1995 | Cosby | 52/12 |
| 5,848,857 | A | * | 12/1998 | Killworth et al. | 405/118 |
| 6,283,302 | B1 | | 9/2001 | Schulte et al. | |
| 6,463,700 | B2 | | 10/2002 | Davis | |
| 6,598,352 | B2 | | 7/2003 | Higginbotham | |
| 6,706,172 | B2 | | 3/2004 | Strawser, Sr. | |
| 6,951,077 | B1 | * | 10/2005 | Higginbotham | 52/12 |
| 7,174,688 | B2 | | 2/2007 | Higginbotham | |
| 7,198,714 | B2 | * | 4/2007 | Swistun | 210/162 |
| 7,303,687 | B2 | | 12/2007 | Groth et al. | |
| 7,627,991 | B1 | | 12/2009 | Feldhaus | |
| 7,730,672 | B2 | | 6/2010 | Knudson | |
| 7,793,465 | B2 | | 9/2010 | McCann | |
| 7,913,458 | B2 | | 3/2011 | Higginbotham | |
| 8,231,010 | B2 | | 7/2012 | Scott et al. | |

(Continued)

FOREIGN PATENT DOCUMENTS

EP    1 268 032    4/2001

*Primary Examiner* — Mark Wendell
(74) *Attorney, Agent, or Firm* — Jenkins, Wilson, Taylor & Hunt, P.A.

(57) ABSTRACT

Gutter guard apparatuses and methods of making the same are provided. A gutter guard apparatus for preventing debris from entering rainwater collection gutters on a structure. A gutter guard apparatus can comprise a guard panel and mesh layer that cooperate to prevent debris from entering a rainwater collection gutter. The mesh layer can be secured to the guard panel at substantially all points of contact between the mesh layer and guard panel to thereby provide a secure and durable gutter guard apparatus. Methods and devices for forming a gutter guard can comprise bonding the mesh layer to a guard panel using a radiant heater, heated roller, adhesive applicator, ultrasonic welder and/or combinations thereof.

8 Claims, 4 Drawing Sheets

(56) References Cited

U.S. PATENT DOCUMENTS

| | | |
|---|---|---|
| 8,261,493 B2 | 9/2012 | Hedrick |
| 8,375,644 B2 | 2/2013 | Robins |
| 8,479,454 B2 | 7/2013 | Lenney et al. |
| 2007/0089372 A1* | 4/2007 | Hammond et al. ............... 52/11 |
| 2007/0234647 A1* | 10/2007 | Higginbotham ................ 52/12 |
| 2008/0163561 A1* | 7/2008 | Lenney et al. .................... 52/12 |
| 2011/0056145 A1* | 3/2011 | Lenney et al. .................... 52/12 |
| 2011/0067318 A1* | 3/2011 | Lenney et al. .................... 52/12 |
| 2013/0160377 A1 | 6/2013 | Sager |
| 2014/0069028 A1* | 3/2014 | Lenney ............................ 52/12 |

* cited by examiner ized over the opening of a conventional, longitudinally-extending, generally U-shaped gutter used for collecting and distributing rainwater runoff from the roofs of residential homes and other buildings. In some embodiments the presently disclosed subject matter employs a dual filtering system applicable for separating small twigs, leaves, pine needles, acorns, and other debris from rainwater entering the gutter. The presently disclosed subject matter effectively prevents this debris from passing into the gutter and clogging the downspouts. The gutter guard of the presently disclosed subject matter comprises a connecting member for securing the gutter guard in position on the gutter, provides added support to help prevent the gutter guard from collapsing under the weight of wet leaves and other debris, and resists separation of the gutter guard from the gutter in windy conditions.

GUTTER GUARD APPARATUSES AND METHODS

CROSS-REFERENCE TO RELATED APPLICATIONS

This application claims priority to and the benefit of U.S. Provisional Application No. 61/862,337, filed Aug. 5, 2013, and to U.S. Provisional Application No. 61/866,211, filed Aug. 15, 2013, the entire disclosures of which are incorporated by reference herein.

TECHNICAL FIELD

This presently disclosed subject matter relates to gutter guard apparatuses and methods of making the same. The presently disclosed subject matter is directed to gutter guard apparatuses for preventing debris from entering rainwater collection gutters on a structure. Methods of making gutter guard apparatuses are also provided.

BACKGROUND

Gutters used for collecting and distributing rainwater runoff from the roofs of residential homes and other buildings can become clogged with debris, e.g. twigs, leaves, pine needles, acorns, and other debris from rainwater. Existing devices for preventing the clogging of gutters are ineffective, deteriorate over time, and/or are cost-prohibitive.

As such, a need exists for gutter guard apparatuses for preventing debris from entering rainwater collection gutters. A need exists for methods of making such gutter guards.

SUMMARY

It is an object of the presently disclosed subject matter to provide novel gutter guard apparatuses, methods and devices for making the same.

An object of the presently disclosed subject matter having been stated hereinabove, and which is achieved in whole or in part by the presently disclosed subject matter, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
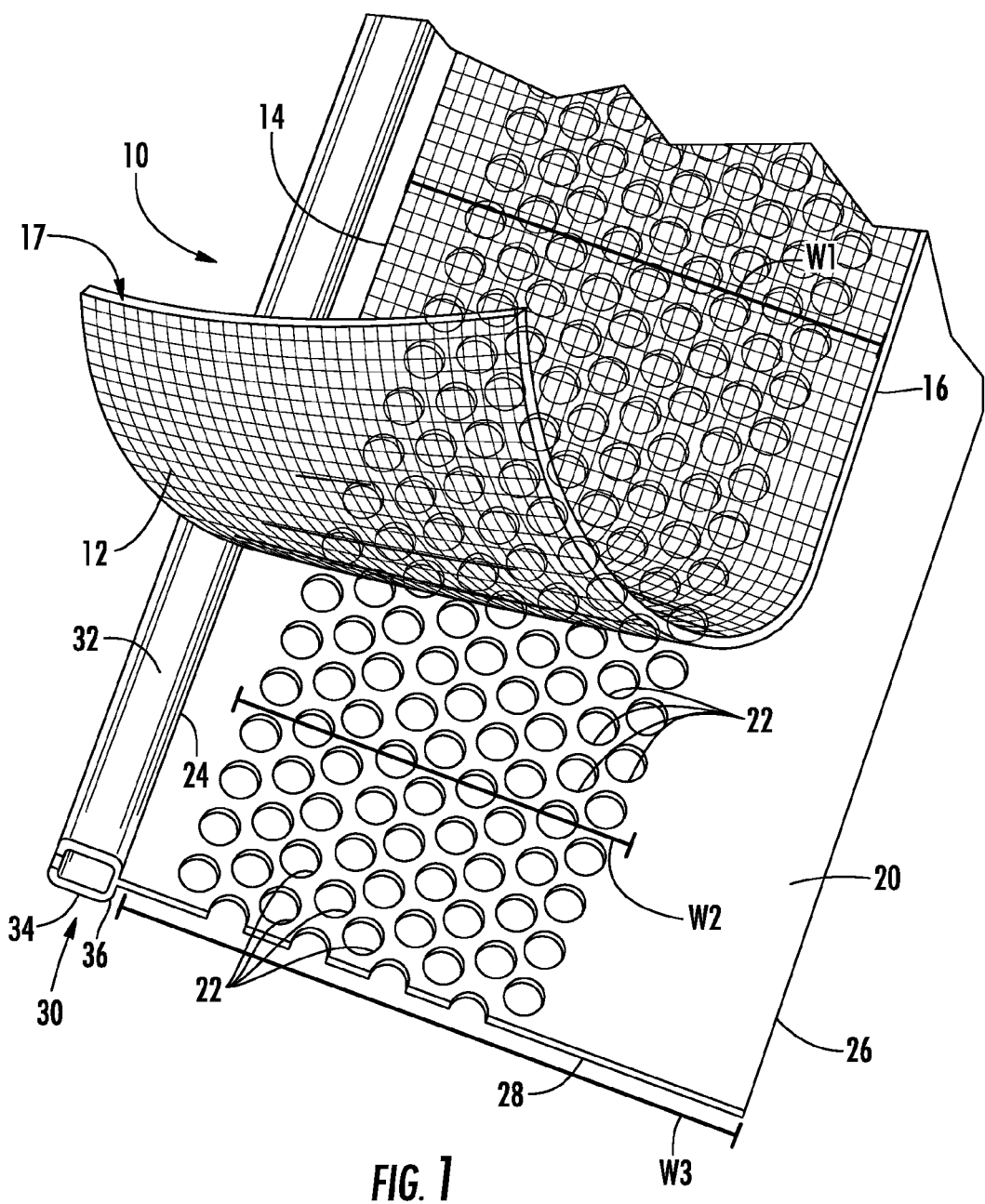
FIG. 1 is a perspective view of a composite gutter guard according to one embodiment, wherein a portion of the fine mesh layer is shown pulled back from the guard panel for illustrative purposes.

The presently disclosed subject matter relates to a gutter guard. The presently disclosed subject matter can be posi- Unlike existing gutter guards, the gutter guard of the presently disclosed subject matter can in some embodiments include a coated mesh layer and perforated guard panel formed of like polymer materials, such as polyvinyl chloride (PVC). The design of the gutter guard of the presently disclosed subject matter can facilitate an effective and secure attachment of the mesh layer to the gutter guard. Other structures and types of attachment mechanisms used in gutter guards conventionally are generally less effective, and more costly, time consuming, and labor intensive. Moreover, the core material of the mesh layer, according to one embodiment of the invention, can be fiberglass fabric. As compared to metal, fiberglass fabric is generally easier to handle, is chemically more stable, and resists corrosion. Fiberglass fabric is also more durable than plastic and possesses greater natural strength which allows for a substantially finer and thinner construction.

In some aspects, a gutter guard as disclosed herein can comprise an elongate guard panel defining a plurality of spaced filter openings, the guard panel being adapted to extend laterally across an opening of a gutter and longitudinally along the length of the gutter. In some aspects the gutter guard can comprise a mesh layer overlying the guard panel in an area of the filter openings, the mesh layer having first and second opposing side edges, first and second opposing end edges, and a surface extending across the filter openings. In some aspects the gutter guard can comprise a continuous heat weld or other bonding, such as chemical bonding for example, securing the mesh layer to the guard panel, wherein the heat weld or other bond extends across substantially the entire surface of the mesh layer from the first side edge to the second side edge, and extends from one end edge of the mesh layer to the opposing end edge of the mesh layer. In some aspects, the heat weld or other bond extending at least substantially across the entire surface of the mesh layer provides for the mesh layer to be secured to the guard panel at substantially all points of contact between the mesh layer and guard panel.

In some embodiments, the gutter guard is a composite gutter guard. The gutter guard can in some embodiments include an elongate polymer guard panel defining a plurality of spaced filter openings. A mesh layer, in some aspects a polymer-coated fiberglass mesh layer, overlies the guard panel in an area of the filter openings and cooperates with the guard panel to capture and separate debris from rainwater runoff entering the gutter. Any other suitable materials for the structures of the gutter guard can be used as well.

In some embodiments, the mesh layer comprises a polymer-coated mesh. In some embodiments, the mesh layer can be formed of fiberglass fabric. In some embodiments, the mesh layer can comprise a PVC coating. In some embodiments, the mesh layer can comprise a PVC-coated, woven fiberglass fabric which readily fuses to the polymer guard panel during welding.

In some embodiments, the filter openings in the guard panel can be between 0.5 and 1.5 centimeters in diameter. In some aspects, the mesh layer can include between 30 and 40 openings per square centimeter.

In some embodiments, gutter guard apparatuses, devices and/or systems of the presently disclosed subject matter can comprise a connecting member for securing the guard panel in position at the opening of the gutter. In some embodiments, the connecting member can comprise a generally C-shaped connecting strip having resilient spaced-apart top and bottom walls adapted for receiving an inwardly-extending flange of the gutter to hold the gutter guard in position during use.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing units of measure, reaction conditions, and so forth used in the specification and claims are to be understood as being modified in all instances by the term "about" and/or "substantially". Accordingly, unless indicated to the contrary, the numerical parameters set forth in this specification and attached claims are approximations that can vary depending upon the desired properties sought to be obtained by the presently disclosed subject matter.

As used herein, the term "about" and/or "substantially," when referring to a value or to a unit of measure, area, temperature, an amount of mass, weight, time, volume, concentration or percentage is meant to encompass variations in some embodiments ±20%, in some embodiments ±10%, in some embodiments ±5%, in some embodiments ±1%, in some embodiments ±0.5%, and in some embodiments ±0.1% from the specified amount, as such variations are appropriate with respect to the disclosed subject matter and/or to perform the disclosed methods.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Turning now to the Figures, an embodiment of a gutter guard according to the presently disclosed subject matter is illustrated in FIG. 1. The gutter guard is shown generally as reference numeral 10. The gutter guard 10 is in some embodiments can be adapted for use on standard, generally U-shaped gutters attached to structures such as residential homes, garages, sheds, commercial buildings and other buildings. Gutter guard 10 can in some embodiments be formed of a composite filter assembly including a mesh layer 12 applied to a semi-rigid, polymer guard panel 20. The mesh layer 12 overlies an area of filter openings 22 formed in the guard panel 20, and can be attached, affixed or secured to the guard panel 20 by continuous heat welding, including ultrasonic welding, or other bonding such as chemical bonding for example, across the entire surface of the mesh layer 12, or substantially the entire surface of the mesh layer 12.

Continuing with FIG. 1, guard panel 20 can comprise a plurality of filter openings 22 through which rain water from a roof can pass into a gutter upon which gutter guard 10 is attached. In some embodiments, filter openings 22 in guard panel 20 can have a diameter ranging from about 0.5 centimeters to about 1.5 centimeters. Filter openings 22 can be evenly spaced apart in a repeating pattern over an area of guard panel 20 having a width W2 as discussed below. Guard panel 20 can have a width W3 (dimensions discussed below) extending from a first longitudinal side edge 24 and a second longitudinal side edge 26. Guard panel 20 can have an end edge 28 and can extend a length L1 (FIG. 2) extending any desirable length as discussed below.

As illustrated in FIG. 1, in some aspects gutter guard 10 can comprise a mesh layer 12 overlying the guard panel 20 in an area of the filter openings 22, the mesh layer 12 having first 14 and second 16 opposing side edges and a surface extending across filter openings 22. Mesh layer 12 can in some embodiments cooperate with guard panel 20, and particularly filter openings 22, to capture and separate debris from rainwater runoff entering the gutter. In some aspects, mesh layer 12 can comprise a mesh material comprising between 30 and 40 openings per square centimeter. In some embodiments, mesh layer 12 can comprise a polymer-coated mesh material, a fiberglass fabric, a flexible fine-mesh fabric and/or a mesh material with a PVC coating. In some embodiments, mesh layer 12 can comprise a PVC-coated, woven fiberglass fabric which readily fuses to a polymer guard panel 20 during welding or bonding as discussed herein.

Figure 2:
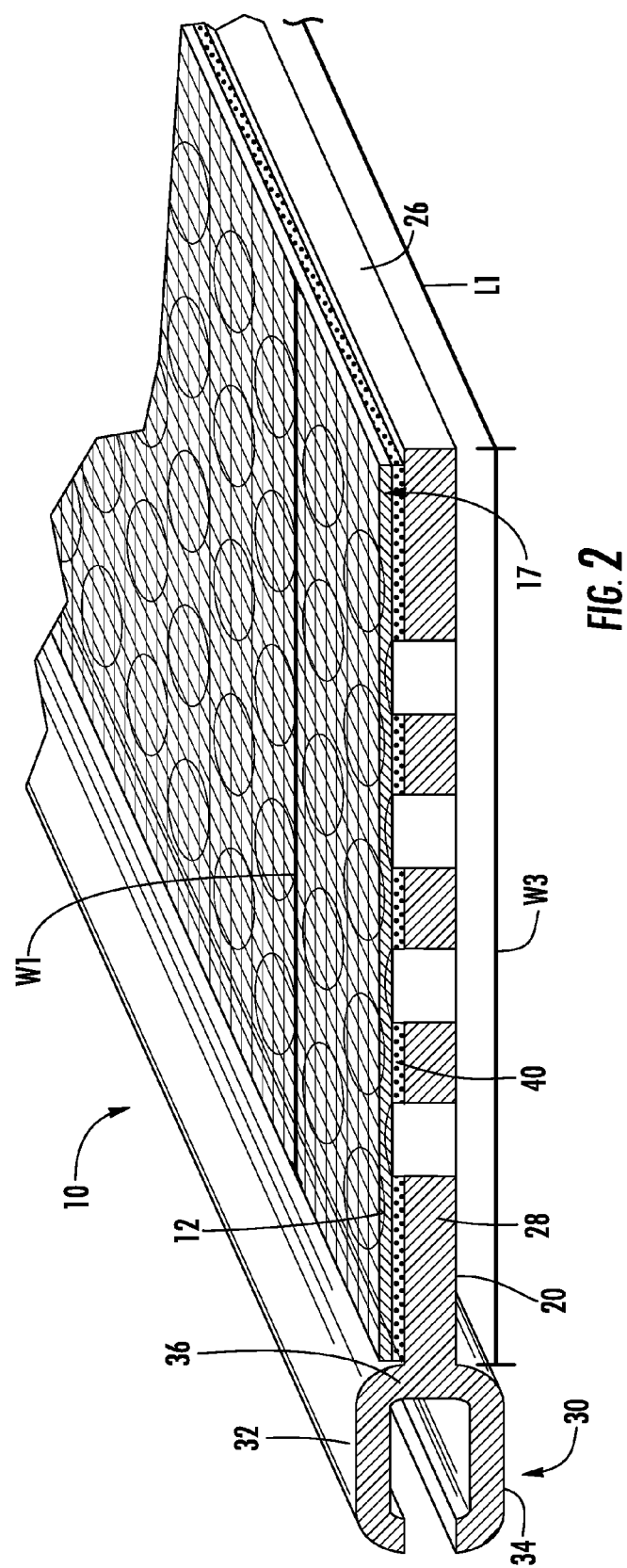
FIG. 2 is a cross-sectional perspective view of a composite gutter guard according to one embodiment.

Continuing with FIG. 1, and referring also to FIG. 2, guard panel 20 can further comprise a longitudinal, generally C-shaped connecting member 30 (or connector strip). Connecting member 30 can in some embodiments be integrally formed with guard panel 20 along a first longitudinal side edge 24 of guard panel 20. In some embodiments connecting member 30 can be made of the same composite material as guard panel 20, but can in some embodiments have an increased rigidity as compared to guard panel 20. In some embodiments, connecting member 30 can comprise resilient spaced-apart top and bottom walls 32 and 34, respectively, formed with end wall 36 and adapted for receiving a portion of a gutter to thereby hold gutter guard 10 in position during use.

FIG. 2 is a cross-sectional perspective view of a composite gutter guard according to one embodiment. For illustrative purposes only, portions of FIG. 2, e.g. mesh layer 12 and bond 40, have been enlarged and may not be to scale. In FIG. 2 bond 40 between mesh layer 12 and guard panel 20 is shown. In some embodiments, bond 40 can comprise a heat weld, an ultrasonic weld, a chemical bond, an adhesive bond, or any other suitable bond sufficient to adhere mesh layer 12 to guard panel 20. In some embodiments, bond 40 is a continuous bond that can extend across the entire, or substantially the entire, width W1 of mesh layer 12 from the first side edge 14 to the second side edge 16 of mesh layer 12, and extends from one end edge 17 of mesh layer 12 to the opposing end edge (not shown) of mesh layer 12. In some embodiments, bond 40 exists at all, or substantially all, areas of mesh layer 12 that is in contact with guard panel 20, i.e. the entire width and length of mesh layer 12. By extending across the entire surface of mesh layer 12, or at least substantially across the entire surface of mesh layer 12, bond 40, e.g. a continuous heat weld, provides for mesh layer 12 to be secured to the guard panel 20 at substantially all points of contact between mesh layer 12 and guard panel 20. A gutter guard 10 as provided herein, particularly where mesh layer 12 is secured to guard panel 20 at substantially all points of contact between mesh layer 12 and guard panel 20, is longer-lasting and more resilient to environmental exposure, particularly as compared to a gutter guard where mesh layer 12 is secured to guard panel 20 only at select locations. The disclosed gutter guard 10 is less likely to result in tearing, ripping or separation of mesh layer 12 from guard panel 20.

Figure 3:
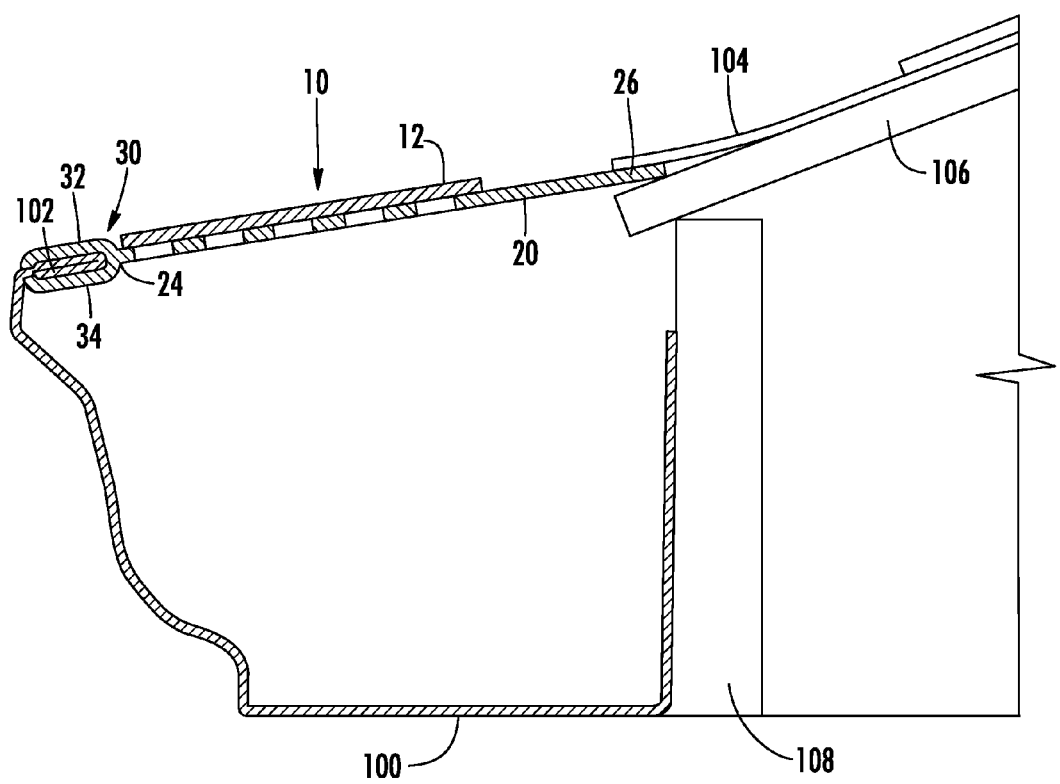
FIG. 3 is a cross-sectional view of a composite gutter guard installed on a gutter of a structure.

Referring to FIG. 3, gutter guard 10 can be positioned over the opening of longitudinally-extending gutter 100, and functions to separate small twigs, leaves, pine needles, acorns, and other debris from rainwater entering the gutter 100 and passing through downspouts outwardly away from the foundation of the house or building. As depicted in FIG. 3, gutter guard 10 can be adapted to extend laterally across the opening of gutter 100 and longitudinally along the length of the gutter 100. A longitudinal, generally C-shaped connecting member 30, of increased rigidity in some embodiments, can be integrally formed with guard panel 20 along a first longitudinal side edge 24 of guard panel 20, and includes resilient spaced-apart top and bottom walls 32 and 34, respectively, formed with end wall 36 and adapted for receiving an inwardly-extending flange 102 of gutter 100 to hold gutter guard 10 in position during use. The opposite or second longitudinal side edge 26 of guard panel 20 of gutter guard 10 can in some embodiments fit beneath a lowermost row of shingles 104 attached to roof 106 of house or building 108, such that rainwater and debris runs from shingle 104 of roof 106 directly to gutter guard 10 before entering gutter 100. Mesh layer 12 cooperates (enlarged in FIG. 3 for illustration purposes only) with guard panel 20 to capture and separate debris from rainwater to prevent the debris from entering gutter 100 while the rainwater passes freely into gutter 100. Continuous bond 40 (illustrated in FIG. 2) ensures that mesh layer 12 is secured to guard panel 20 at substantially all points of contact between mesh layer 12 and guard panel 20 so as to prevent debris and environmental exposure from loosening or removing mesh layer 12 from guard panel 20, thereby ensuring a long-lasting and durable gutter guard.

Gutter guard 10 can in some embodiments be formed in predetermined lengths and widths depending on the dimensions of the gutter to which it is to be applied. The dimensions of guard panel 20, filter openings 22 and mesh layer 12 can be vary correspondingly. In some embodiments, mesh layer 12 can have a width W1 sufficient to cover filter openings 22, including the width W2 of the area of filter openings 22 (see FIG. 1 and/or FIG. 2). For example, in some embodiments, mesh layer 12 can have a width W1 ranging from about 3 inches to about 7 inches, including a width W1 of about 3 inches, 3.5 inches, 4 inches, 4.5 inches, 5 inches, 5.5 inches, 6 inches, 6.5 inches or 7 inches. In some embodiments mesh layer 12 can be cut to a length corresponding to the length of guard panel 20 upon which it is applied. In some embodiments, guard panel 20 can have a width W3 sufficient to fit the opening of a gutter 100 such as that depicted in FIG. 3. For example, in some embodiments, guard panel 20 can have a width W3 ranging from about 4 inches to about 10 inches, including a width W3 of about 4 inches, 4.5 inches, 5 inches, 5.5 inches, 6 inches, 6.5 inches, 7 inches, 7.5 inches, 8 inches, 8.5 inches, 9 inches, 9.5 inches or 10 inches. In some embodiments guard panel 20 can have a length L1 corresponding to a given length of gutter to which gutter guard 10 is to be applied. In some embodiments, guard panel 20, and therefore gutter guard 10, can be provided in pre-determined lengths suitable convenient for handling, storage, delivery and application to sections of gutter. By way of example and not limitation, gutter guard 10 can be provided in 3 foot lengths, 4 foot lengths, 5 foot lengths, 6 foot lengths, 7 foot lengths, 8 foot lengths and the like. In some aspects the finished gutter guard 10 cut in pre-determined lengths is also provided in a substantially flat condition to avoid pinching connecting member 30 and destroying its operability.

In some aspects, the width W2 of the area of guard panel 20 covered by filter openings 22 can vary depending on the width W3 of guard panel 20. In some aspects, width W2 of the filter openings 22 can be less that width W3 of guard panel 20, but can in some embodiments be cover a substantial portion of width W3 of guard panel 20 so as to provide sufficient surface area through which rain water can pass into gutter 100 (see FIG. 3). In some aspects, the width W2 of the area of guard panel 20 covered by filter openings 22 can range from about from about 3 inches to about 7 inches, including a width W2 of about 3 inches, 3.5 inches, 4 inches, 4.5 inches, 5 inches, 5.5 inches, 6 inches, 6.5 inches or 7 inches. In some embodiments, filter openings 22 can extend the entire length L1, or substantially the entire length L1, of guard panel 20.

In some embodiments, a method of forming a gutter guard 10 can comprise forming a plurality of filter openings 22 in an elongate polymer guard panel 20. A mesh layer 12, e.g. a polymer-coated mesh layer, can be applied over the guard panel 20 in an area of the filter openings 22 and attached or affixed to guard panel 20 by creating a secure bond between mesh layer 12 and guard panel 20. The mesh layer 12 can be bonded to guard panel 20 across substantially the entire surface of mesh layer 12 whereby mesh layer 12 is secured to guard panel 20 at substantially all points of contact between mesh layer 12 and guard panel 20.

In some embodiments, the bonding of mesh layer 12 to guard panel 20 can comprise the use of heat welding, ultrasonic welding, hot rollers, pressure rollers, a heat lamp, and/or combinations thereof. Bond 40 (see FIG. 2) can comprise a heat weld, an ultrasonic weld, a chemical bond, an adhesive bond, or any other suitable bond sufficient to adhere mesh layer 12 to guard panel 20. In some embodiments, ultrasonic welding can comprise a welding horn, a knurl roller and an amplifier. In some aspects, a flat horn can press against the bottom of the gutter guard being formed while a knurl roller presses against the top. In some aspects multiple horns can be used in an ultrasonic welding method. In some aspects, an amplifier can be used in conjunction with one or more horns in an ultrasonic welding method. In some embodiments, a continuous roll of guard panel 20 can be fed into a welding device, while a continuous roll of mesh layer 12 can also be fed into the welding device, such that mesh layer 12 is heat welded to guard panel 20. Gutter guard 10 can in some embodiments be formed in predetermined lengths, such as for example 3 foot lengths, and in a substantially flat condition to avoid pinching or kinking the gutter guard.

In some embodiments, the temperature of the bonding method, e.g. heat weld, can for example and without limitation, range from about 160 degrees Fahrenheit to about 250 degrees Fahrenheit. In some embodiments, the temperature of the bonding, e.g. heat weld, can range from about 210 degrees Fahrenheit to about 230 degrees Fahrenheit. In some embodiments, the temperature of the heat weld can be about 220 degrees Fahrenheit. In some embodiments, the mesh layer will begin to melt at about 160 degrees Fahrenheit.

Turning now to FIGS. 4A-4D, devices, systems and methods for making the composite gutter guards as illustrated in FIGS. 1-3 are schematically illustrated. FIGS. 4A-4D illustrate exemplary devices or welding devices for affixing or adhering mesh layer 12 to the guard panel 20 to thereby form gutter guard 10.

Figure 4A:
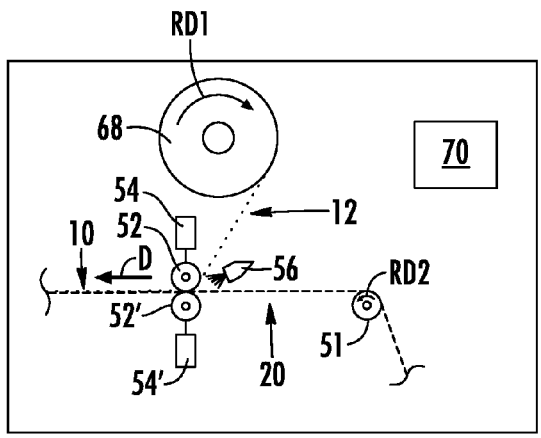
FIGS. 4A-4D are schematic illustrations of devices, systems and methods for making composite gutter guards as disclosed herein.

Device 50A, as illustrated in FIG. 4A, can in some embodiments comprise a mechanism for feeding mesh layer 12 and guard panel 20, one or more pressure rollers (52, 52'), a radiant heater 56, and a control device 70.

Using device 50A, as illustrated in FIG. 4A, mesh layer 12 can be bonded to guard panel 20 using a radiant heater 56, such as for example a heat lamp. Radiant heater 56 can heat one or both of guard panel 20 and/or mesh layer 12 just prior to bonding or pressing the two together using pressure rollers 52 and/or 52', e.g. knurl rollers. Mesh layer 12 and guard panel 20 can be continuously fed into device 50A. In some embodiments, mesh layer 12 can be fed into device 50 from roll 68 of mesh layer 12 by rotating roll 68 in a first rotational direction RD1. Guard panel 20 can be continuously fed into device 50A using one or more rollers or guides, such as for example roller 51, rotating in a second rotational direction RD2. In some aspects, both mesh layer 12 and guard panel 20 are fed into and through device 50 in the same direction D. Radiant heater 56 can be positioned such that one or both of guard panel 20 and/or mesh layer 12 are heated to a desired temperature just prior to bonding or pressing the two together using pressure rollers 52 and/or 52' to thereby create a continuous heat weld, or bond 40 (see FIG. 2), between all points of contact between mesh layer 12 and guard panel 20.

In some embodiments, guard panel 20 and/or mesh layer 12 are heated to a range from about 160 degrees Fahrenheit to about 250 degrees Fahrenheit. In some embodiments, the temperature of the bonding, e.g. heat weld, can range from about 210 degrees Fahrenheit to about 230 degrees Fahrenheit. In some embodiments, the temperature of the heat weld can be about 220 degrees Fahrenheit. In some embodiments, mesh layer 12 will begin to melt at about 160 degrees Fahrenheit at which point it can be heat welded or bonded to guard panel 20.

As guard panel 20 and/or mesh layer 12 are heated using radiant heater 56, or shortly after heating, the bonding between guard panel 20 and mesh layer 12 can in some embodiments be facilitated using one or more pressure rollers 52 and/or 52', e.g. knurl rollers. Pressure can in some embodiments be applied to pressure rollers 52 and/or 52' using pressure applicators 54 and 54', respectively. In some embodiments, control device 70 can control the rate at which mesh layer 12 and/or guard panel 20 are fed into and through device 50A, the temperature applied by radiant heater 56, and/or the pressure applied by pressure rollers 52 and/or 52'.

Figure 4B:
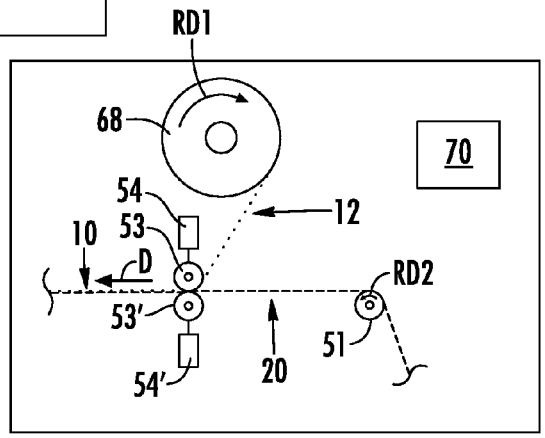

Device 50B, as illustrated in FIG. 4B, can in some embodiments comprise a mechanism for feeding mesh layer 12 and guard panel 20, one or more heated rollers (53, 53'), and a control device 70. Using device 50B, as illustrated in FIG. 4B, mesh layer 12 can be bonded to guard panel 20 using one or more heated rollers 53, 53'. The one or more heated rollers 53, 53' can heat one or both of guard panel 20 and/or mesh layer 12 while simultaneously bonding or pressing the two together. In some aspects, heated rollers 53, 53' can comprise heated knurl rollers that apply pressure to guard panel 20 and/or mesh layer 12 simultaneous with heat. Mesh layer 12 and guard panel 20 can be continuously fed into device 50B. In some embodiments, mesh layer 12 can be fed into device 50 from roll 68 of mesh layer 12 by rotating roll 68 in a first rotational direction RD1. Guard panel 20 can be continuously fed into device 50 using one or more rollers or guides, such as for example roller 51, rotating in a second rotational direction RD2. In some aspects, both mesh layer 12 and guard panel 20 are fed into and through device 50B in the same direction D. Heated rollers 53, 53' can heat one or both of guard panel 20 and/or mesh layer 12 to a desired temperature just prior to bonding or pressing the two together to thereby create a continuous heat weld, or bond 40 (see FIG. 2), between all points of contact between mesh layer 12 and guard panel 20.

In some embodiments, guard panel 20 and/or mesh layer 12 are heated to a range from about 160 degrees Fahrenheit to about 250 degrees Fahrenheit. In some embodiments, the temperature of the bonding, e.g. heat weld, can range from about 210 degrees Fahrenheit to about 230 degrees Fahrenheit. In some embodiments, the temperature of the heat weld can be about 220 degrees Fahrenheit. In some embodiments, mesh layer 12 will begin to melt at about 160 degrees Fahrenheit at which point it can be heat welded or bonded to guard panel 20.

As guard panel 20 and/or mesh layer 12 are heated using one or more of heated rollers 53, 53' a bond or heat weld between guard panel 20 and mesh layer 12 can in some embodiments be facilitated by simultaneously applying pressure via pressure applicators 54 and 54' which can be mechanically coupled to heated rollers 53, 53'. In some embodiments, control device 70 can control the rate at which mesh layer 12 and/or guard panel 20 are fed into and through device 50B, the temperature and/or pressure applied by heated and/or pressured rollers 53 and/or 53'.

Figure 4C:
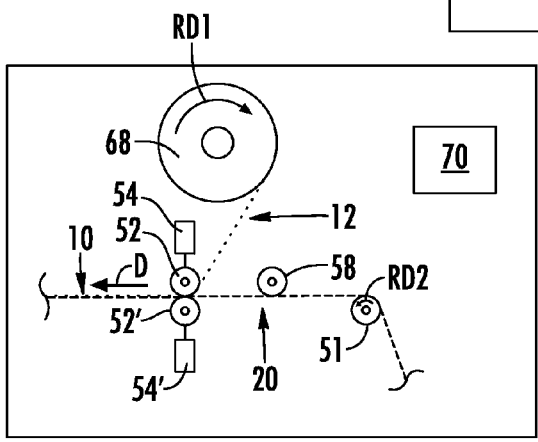

Device 50C, as illustrated in FIG. 4C, can in some embodiments comprise a mechanism for feeding mesh layer 12 and guard panel 20, an adhesive applicator 58, one or more pressure rollers (52, 52'), and a control device 70. Using device 50C, as illustrated in FIG. 4C, mesh layer 12 can be bonded to guard panel 20 using an adhesive or other bonding compound applied in some embodiments using an adhesive applicator 58, e.g. a glue roller. In some aspects, one or more pressure rollers 52, 52' can apply pressure to bond guard panel 20 and/or mesh layer 12 together after application of the adhesive compound. In some aspects, pressure rollers 52, 52' can comprise knurl rollers. Mesh layer 12 and guard panel 20 can be continuously fed into device 50B. In some embodiments, mesh layer 12 can be fed into device 50 from roll 68 of mesh layer 12 by rotating roll 68 in a first rotational direction RD1. Guard panel 20 can be continuously fed into device 50 using one or more rollers or guides, such as for example roller 51, rotating in a second rotational direction RD2. In some aspects, both mesh layer 12 and guard panel 20 are fed into and through device 50B in the same direction D.

Adhesive applicator 58 can apply an adhesive compound to one or both of guard panel 20 and/or mesh layer 12 (depicted as being applied to guard panel 20 in FIG. 4C for illustrative purposes only). Adhesive can be applied to one or both of guard panel 20 and/or mesh layer 12, and the two bonded together, such that a continuous bond, e.g. bond 40 (see FIG. 2), is created between all points of contact between mesh layer 12 and guard panel 20. In some embodiments, adhesive applicator 58 can comprise a glue applicator roll, a Kiss roller or doctor blade. In some aspects the adhesive can comprise an adhesive compound, glue, chemical bonding agent or any suitable bonding agent suitable for securely adhering mesh layer 12 to guard panel 20. In some embodiments, control device 70 can control the rate at which mesh layer 12 and/or guard panel 20 are fed into and through device 50C, the pressure applied by pressure rollers 52 and/or 52', and/or adhesive applicator 58.

Figure 4D:
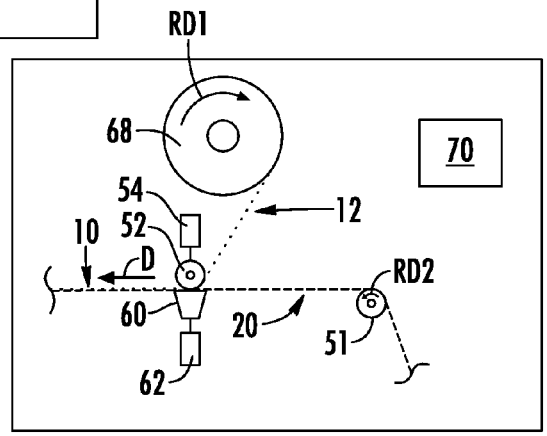

Device 50D, as illustrated in FIG. 4D, can in some embodiments comprise a mechanism for feeding mesh layer 12 and guard panel 20, one or more rollers 52, an ultrasonic welding horn 60, and a control device 70. Using device 50D, as illustrated in FIG. 4D, mesh layer 12 can be bonded to guard panel 20 using an ultrasonic welding device comprising in some embodiments an ultrasonic welding horn 60 and roller 52. The welding horn 60, alone or in combination with pressure applied by one or more rollers 52, can create a weld, or bond 40 (see FIG. 2), that adheres mesh layer 12 to guard panel 20 such that a secure bond exists between all points of contact between mesh layer 12 and guard panel 20. In some aspects, roller 52 can comprise a knurl roller that applies pressure to guard panel 20 and/or mesh layer 12 simultaneous while welding horn 60 creates a weld. Mesh layer 12 and guard panel 20 can be continuously fed into device 50D. In some embodiments, mesh layer 12 can be fed into device 50D from roll 68 of mesh layer 12 by rotating roll 68 in a first rotational direction RD1. Guard panel 20 can be continuously fed into device 50D using one or more rollers or guides, such as for example roller 51, rotating in a second rotational direction RD2. In some aspects, both mesh layer 12 and guard panel 20 are fed into and through device 50D in the same direction D.

In some embodiments, guard panel 20 and/or mesh layer 12 are heated to a range from about 160 degrees Fahrenheit to about 250 degrees Fahrenheit. In some embodiments, the temperature of the bonding, e.g. heat weld, can range from about 210 degrees Fahrenheit to about 230 degrees Fahrenheit. In some embodiments, the temperature of the heat weld can be about 220 degrees Fahrenheit. In some embodiments, mesh layer 12 will begin to melt at about 160 degrees Fahrenheit at which point it can be heat welded or bonded to guard panel 20.

Ultrasonic welding device can in some embodiments comprise an ultrasonic welding horn 60, e.g. a flat horn, an amplifier 62 and roller 52, e.g. a knurl roller. In some aspects, ultrasonic welding horn 60, and particularly a flat horn, can press against the bottom of gutter guard 10 being formed while roller 52, and particularly a knurl roller, presses against the top. In some aspects, multiple ultrasonic welding horns 60, can be used in an ultrasonic welding method. In some aspects, an amplifier 62 can be used in conjunction with one or more welding horns 60 in an ultrasonic welding method. As guard panel 20 and/or mesh layer 12 are heated using ultrasonic welding horn 60 a bond or heat weld between guard panel 20 and mesh layer 12 can in some embodiments be facilitated by simultaneously applying pressure via pressure applicator 54 which can be mechanically coupled to roller 52. In some embodiments, control device 70 can control the rate at which mesh layer 12 and/or guard panel 20 are fed into and through device 50B, the operation of ultrasonic welding horn 60, amplifier 62 and/or roller 52.

In some embodiments, features of any one of devices 50A, 50B, 50C and/or 50D can be combined any manner suitable to adhere mesh layer 12 to guard panel 20. For example, any one or more of a radiant heater 56, heated roller 53, adhesive applicator 58 and/or ultrasonic welding horn 60 can combined and/or used simultaneously in a device, system or method of making a gutter guard 10.

In some embodiments, a method of forming a gutter guard 10 is provided. A gutter guard 10 formed by such method can be adapted for being positioned at an opening of a longitudinally extending, generally U-shaped gutter used for collecting and distributing rainwater runoff from the roofs of residential homes and other buildings. Such a method can in some embodiments comprise the use of a device, system or apparatus as illustrated in FIGS. 4A-4D and as disclosed herein.

In some embodiments, a method of forming a gutter guard 10 can comprise forming a plurality of filter openings in an elongate polymer guard panel, the guard panel being adapted to extend laterally across the opening of the gutter and longitudinally along the length of the gutter. The method can further comprise applying a polymer-coated mesh layer over the guard panel in an area of the filter openings, the mesh layer having first and second opposing side edges and first and second opposing end edges, and the mesh layer cooperating with the guard panel to capture and separate debris from rainwater runoff entering the gutter. Finally, in some embodiments the method can comprise bonding the mesh layer to the guard panel across substantially the entire surface of the mesh layer from the first side edge to the second side edge, and extending from one end edge of the mesh later to the opposing end edge of the mesh layer, whereby the mesh layer is secured to the guard panel at substantially all points of contact between the mesh layer and guard panel.

In some embodiments, the bonding can comprise heat welding, such as for example the use of ultrasonic welding, a hot roller, radiant heater and/or heat lamp. In some embodiments, the ultrasonic welding comprises a welding horn, a knurl roller and/or an amplifier. In some embodiments, the temperature of the heat weld ranges from about 160 degrees Fahrenheit to about 250 degrees Fahrenheit. In some embodiments, the method can comprise the use of one or more heated rollers. In some embodiments, the method can comprise coating the mesh layer and/or the guard panel with a chemical bonding agent. In some embodiments, the method can comprise using a Kiss roller or doctor blade to apply the chemical bonding agent.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method of forming a gutter guard adapted for being positioned at an opening of a longitudinally extending, generally U-shaped gutter used for collecting and distributing rainwater runoff from the roofs of residential homes and other buildings, the method comprising:

forming a plurality of filter openings in an elongate polymer guard panel, the guard panel being adapted to extend laterally across the opening of the gutter and longitudinally along the length of the gutter;

applying a mesh layer over the guard panel in an area of the filter openings, the mesh layer having first and second opposing side edges and first and second opposing end edges, and the mesh layer cooperating with the guard panel to capture and separate debris from rainwater runoff entering the gutter; and bonding an entire surface of the mesh layer to the guard panel across the entire surface of the mesh layer from the first side edge to the second side edge, and extending from one end edge of the mesh layer to the opposing end edge of the mesh layer, whereby the entire surface of the mesh layer is secured to and in contact with the guard panel.

2. The method of claim 1, wherein the bonding comprises heat welding comprising the use of ultrasonic welding, a hot roller or a heat lamp.

3. The method of claim 2, wherein the heat welding is ultrasonic welding, wherein the ultrasonic welding comprises a welding horn, a knurl roller and an amplifier.

4. The method of claim 2, wherein the temperature of the heat weld ranges from 160 degrees Fahrenheit to 250 degrees Fahrenheit.

5. The method of claim 1, wherein the bonding comprises use of a radiant heater or heat lamp.

6. The method of claim 1, wherein the bonding comprises use of one or more heated rollers.

7. The method of claim 1, wherein the bonding comprises coating the mesh layer or the guard panel with a chemical bonding agent.

8. The method of claim 7, further comprising using a Kiss roller or doctor blade to apply the chemical bonding agent.

* * * * *